(No Model.)
J. PYMM.
SCREW SHANK AND FERRULE.
No. 430,685. Patented June 24, 1890.
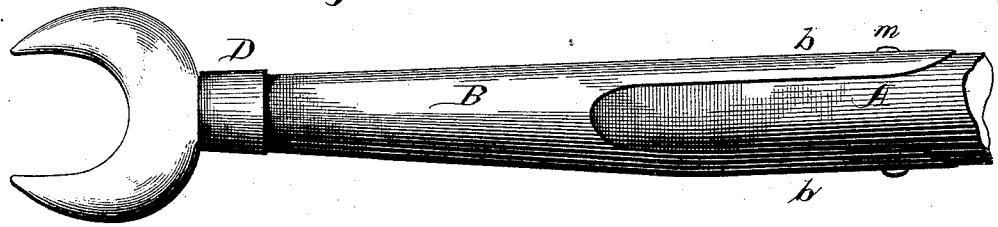
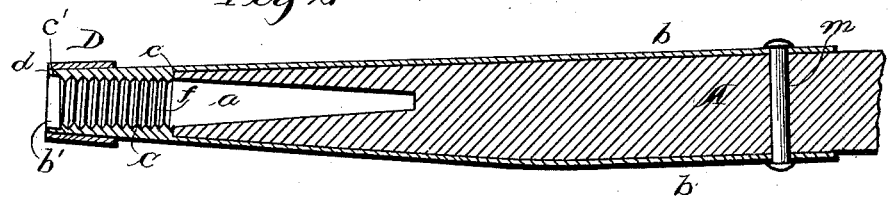
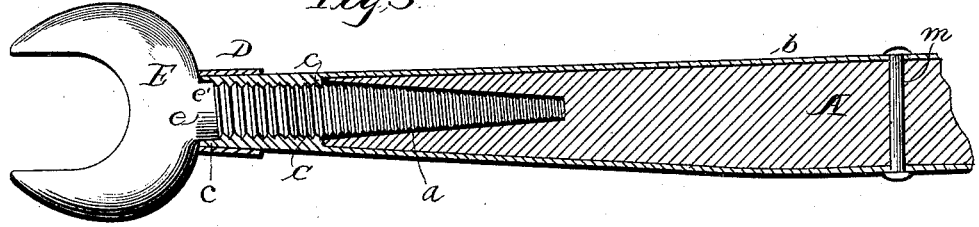
Witnesses
C. C. Burdine.
J. P. Davis.
Inventor
John Pymm
per
A. G. DuBois
his Atty.

UNITED STATES PATENT OFFICE.

JOHN PYMM, OF ST. GEORGE, UTAH TERRITORY.

SCREW SHANK AND FERRULE.

SPECIFICATION forming part of Letters Patent No. 430,685, dated June 24, 1890.

Application filed February 25, 1890. Serial No. 341,745. (No model.)

*To all whom it may concern:*

Be it known that I, JOHN PYMM, a citizen of the United States, residing at St. George, in the county of Washington and Territory of Utah, have invented certain new and useful Improvements in Screw Shanks and Ferrules; and I do hereby declare the following to be a full, clear, and exact description of the invention, such as will enable others skilled in the art to which it appertains to make and use the same.

My invention relates to screw ferrules and shanks for agricultural and other hand-implements, such as hoes, rakes, pitch-forks, potato-forks, &c.; and my object is to produce a more simple, strong, and durable arrangement of parts than has hitherto been in vogue.

With this end in view my invention consists in certain peculiarities of construction and combinations of parts, more fully set forth hereinafter, and particularly pointed out in the claim.

Referring to the accompanying drawings, making part of this specification, Figure 1 is a side elevation of my complete device; Fig. 2, a longitudinal section with the shank removed, and Fig. 3 a similar view with the shank inserted.

The reference-letter A designates the handle of a garden or other implement, which is provided, as usual, with a tapering end, and also in this end a longitudinal chamber $a$ receding from its face and tapering in the usual manner. On this handle is placed a sleeve or ferrule B, which projects from its outer end some distance, preferably about two inches, and is bifurcated at its rear end to form prongs $b$, through which extends the rivet $m$, which runs through the handle and secures the ferrule on the latter. An annular shoulder $c$ is formed by the lower face of the handle end, and against this shoulder is placed an internally-threaded ring C, which has a thickness equal to that of said shoulder, and fits snugly within the projecting portion of the ferrule B, but does not extend to the outer extremity of the same, a plain interior surface $b'$ of said ferrule being left, and the outer end of the threaded ring forming an annular shoulder $c'$. The projecting end of the ferrule is re-enforced by a plain sleeve or ring D, which fits snugly over it and is of the same length, so that its outer periphery lies in the same plane with that of the ferrule, thus forming a double bearing-surface $d$, against which the shoulder $e$ of the shank E fits. This shank E has a short smooth or plain portion $e'$, extending from the shoulder $e$, and from this point tapers to correspond with the recess $a$ of the handle, and is provided with threads $f$, which extend its entire length beyond the portion $e'$.

It will be understood that all the parts—viz., the ferrule, internally-threaded ring, and external sleeve—have a slight corresponding taper to conform to that of the handle end and chamber $a$.

The parts are fitted together in the following manner: The shank is inserted in the tapering aperture formed by the ferrule and recess $a$ until the threads $f$ engage those of the ring C, when the shank will be screwed in, and as the threads pass the inner end of the ring they will cut into the inner surface or wall of the opening $a$. The shank is screwed in as far as possible—that is, until its annular shoulder $e$ engages the double bearing-surface $d$, formed by the ferrule and auxiliary sleeve. The plain portion $e'$ will then fit the corresponding plain inner surface $b'$ of the projecting end of the ferrule B, and it will thus be apparent that an exceedingly tight, compact, and neatly-appearing junction will be effected between the handle and implement, and at the same time the two parts will be very strongly and rigidly fitted together, and the article thus rendered handy and durable.

It is evident that my arrangement might be varied in many slight ways which might suggest themselves to a mechanical mind. Therefore I do not confine myself to the precise construction shown, but consider myself entitled to all such variations as come within the scope and spirit of the invention.

Having thus described my invention, what I claim as new, and desire to secure by Letters Patent, is—

In an implement, the combination of a handle having a tapering recess, a ferrule secured to said handle and projecting therefrom, a threaded ring inside said projecting portion and fitting against the end of the handle, a threaded shank engaging said ring, and also the tapering recess of the handle, and a reenforcing ring surrounding the projecting end of the ferrule, forming with it a double shoulder against which the head of the shank abuts, substantially as described.

In testimony whereof I affix my signature in presence of two witnesses.

JOHN PYMM.

Witnesses:
   EDWARD A. DODGE,
   SETH A. PYMM.